United States Patent [19]

Weyandt

[11] 4,354,618
[45] Oct. 19, 1982

[54] BRAKING METHOD AND APPARATUS FOR VIBRATORY FEEDER

[75] Inventor: Ronald R. Weyandt, Chesterland, Ohio

[73] Assignee: Automated Packaging Systems, Inc., Twinsburg, Ohio

[21] Appl. No.: 150,096

[22] Filed: May 15, 1980

Related U.S. Application Data

[63] Continuation-in-part of Ser. No. 53,104, Jun. 28, 1979, abandoned.

[51] Int. Cl.³ .................... B65G 27/24; B65G 27/32; H02K 33/02; H02P 3/26
[52] U.S. Cl. .................... 221/186; 198/753; 198/757; 198/760; 198/769; 222/63; 318/128; 318/130; 318/132
[58] Field of Search ............... 198/753, 756, 757, 760, 198/761, 762, 769, 752, 759, 766, 767; 318/127, 128, 129, 130, 132, 126, 134; 221/186; 222/63; 73/664, 668, DIG. 3

[56] References Cited

U.S. PATENT DOCUMENTS

| | | | |
|---|---|---|---|
| 2,322,217 | 6/1943 | Baird | 318/128 |
| 2,366,075 | 12/1944 | Weyandt | 318/132 X |
| 2,885,617 | 5/1959 | Kast et al. | 318/128 |
| 2,935,671 | 5/1960 | Ross | 318/128 |
| 3,056,910 | 10/1962 | Hajian | 318/128 |
| 3,080,961 | 3/1963 | Allen et al. | 198/753 |
| 3,286,528 | 11/1966 | Julien-Davin | 73/DIG. 3 X |
| 3,331,239 | 7/1967 | Larsen et al. | 318/128 X |
| 3,463,984 | 8/1969 | Ross et al. | 318/134 X |
| 3,504,250 | 3/1970 | Stevens, Jr. et al. | 318/132 X |
| 3,519,907 | 7/1970 | White et al. | 318/132 X |
| 3,648,136 | 3/1972 | Krajewski et al. | 318/132 X |
| 3,748,553 | 7/1973 | Reiner | 318/128 |
| 4,053,817 | 10/1977 | Yeasting | 318/128 |

Primary Examiner—Robert B. Reeves
Assistant Examiner—Edward M. Wacyra
Attorney, Agent, or Firm—Watts, Hoffman, Fisher & Heinke Co.

[57] ABSTRACT

A material dispensing apparatus including drive structure for driving a feeder bowl is disclosed. A control circuit for controlling the drive includes a Hall effect amplitude sensing transducer for monitoring the magnitude of bowl vibrations and a braking circuit for controlling the damping of vibratory motion after the requisite amount of material has been fed from the feeder bowl. The braking circuit selectively reverses the current flow through a drive coil which comprises a portion of the drive circuitry of the apparatus. This current reversal disrupts the rhythm of forced oscillations which feed material from the bowl and causes bowl motion to be damped. A mechanical brake coupled to the bowl complements the braking action of braking circuit and locks the bowl in place to prevent accidental dispensing of parts.

15 Claims, 11 Drawing Figures

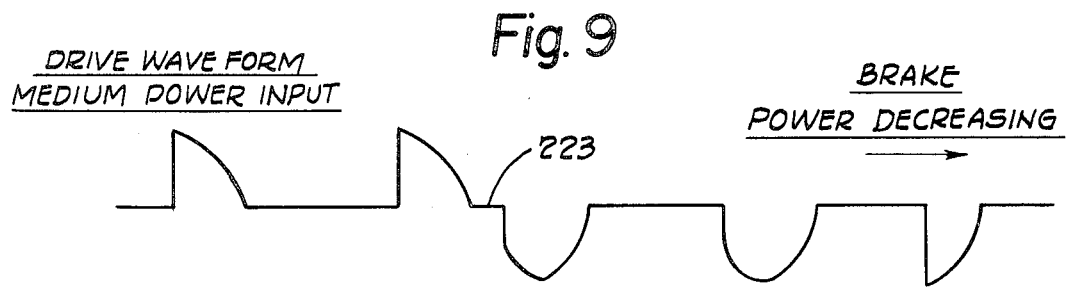
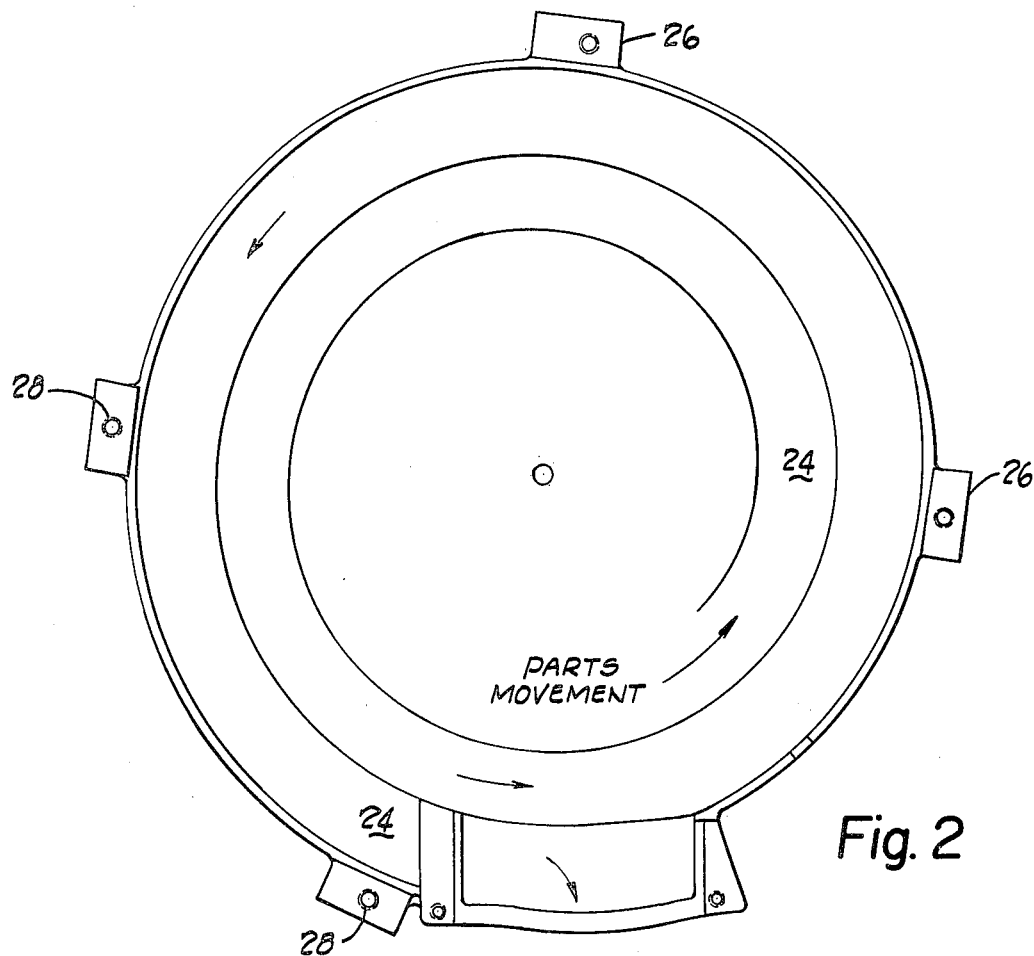
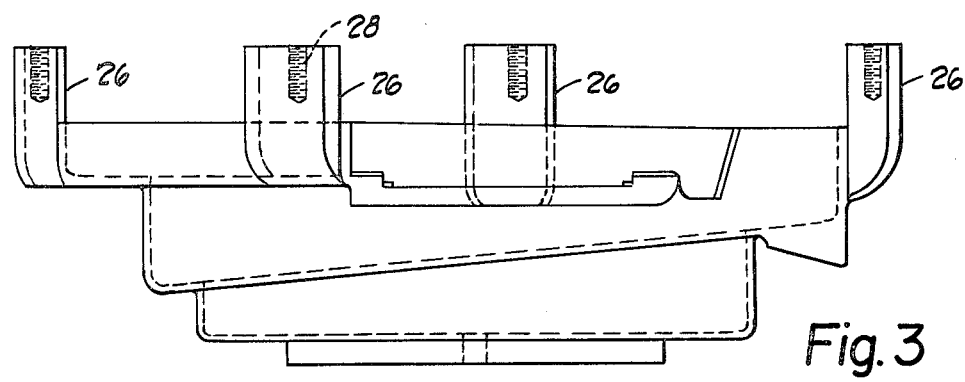

BRAKING METHOD AND APPARATUS FOR VIBRATORY FEEDER

CROSS REFERENCE TO RELATED APPLICATIONS

This is a continuation in part of a U.S. patent application filed June 28, 1979 entitled, "Braking Method and Apparatus for Vibratory Feeder" which has been accorded Ser. No. 053,104, now abandoned.

BACKGROUND OF THE INVENTION

1. Field of the Invention

The invention relates generally to a vibratory feed mechanism, and in particular, to a feed mechanism which includes an improved amplitude sensing and damping method and apparatus.

2. Prior Art

Systems including vibratory feeder bowls are known for feeding streams of parts or other particulate material. Such a system typically includes a feeder bowl coupled to a stationary base by leaf springs. Relative movement of the bowl and base causes parts within the bowl to move up an incline spiral path and fall into an accumulating container.

In a typical system parts segregated by a vibratory feeder bowl are either weighed or counted to collect a batch of a desired size. Once the batch is complete, the parts are either moved away from the feeder by a conveyor system or are dumped from a first accumulator to a second receptacle and then removed.

As an example, three vibratory feeder mechanisms might be arranged in parallel. A first mechanism would deposit a desired number of bolts onto a conveyor. The second and third feeder mechanisms would send an identical number of nuts and washers to the conveyor to be added to the bolts provided by the first mechanism. In this way a like number of nuts, bolts and washers will be fed from individual vibratory mechanisms and combined to form a batch each containing the proper number of parts. Typically they are then fed to a packaging station.

As the parts are dispensed from the feeder bowl it is desirable that the amplitude of vibration of the feeder mechanism remain approximately constant. It is known that the amplitude of bowl vibration depends upon the mass of materials within the bowl. As the total mass of the bowl contents decreases, a reduction in driving power is necessary to maintain a given amplitude of vibration for the bowl. As the amount of bowl contents increases, the amplitude of vibration will diminish for a given driving power. Proposals have been made to sense the amplitude of vibration of the driven bowl and compensate for changes in the bowl by varying the power acting upon the bowl. The objective of such proposals is to maintain relatively constant vibratory amplitude while parts are being fed to an accumulator.

Prior amplitude sensing techniques have employed inductive elements mounted to the feeder in close relation to a magnet which vibrates with the feeder bowl. As the bowl vibrates, thereby feeding parts in the bowl to a conveyor or packaging station, relative motion between the magnet and an inductor produces an oscillating electrical signal whose magnitude depends upon the amplitude of vibration. This signal has been used to sense the amplitude and control the driving power to the bowl. At small amplitudes of vibration, however, the signal generated in this manner was too small to provide an adequate control signal.

A small amplitude of oscillation is particularly useful in small batch processing where a large amplitude is inefficient since the feeder is continually being started and stopped. Thus, prior art amplitude sensing techniques have been somewhat inadequate when controlling the feeding of small batches of parts.

Another problem with prior vibratory bowl feeders is that they are characterized by inefficient batch feed through due to problems encountered stopping vibrations when a batch has been completed. Prior systems count the number or weigh the mass of units fed from the bowl and seek to terminate the drive power to the bowl when the proper number or weight of units has been fed. A problem has been that when the power has been removed from the driving circuitry, the bowl continues to oscillate or vibrate for a finite period of time due to its inertia and the restoring action of its coupling leaf springs. As the bowl continues to vibrate, the units within the bowl may continue to be fed from it and accumulate in the container. Thus undamped oscillation after power termination may send more than the requisite number of units into an accumulator or container.

Expressed another way, one problem has been that prior feeders tend to over feed. Various expedients have been used to compensate for the over feed problem but the problem itself has continued.

Some prior art systems have dealt with the over feed problem by including a diverter into which the excess parts were fed after forced bowl vibrations were terminated. The excess parts were accumulated and periodically emptied back into the vibratory feeder bowl. These diverter systems were inefficient since the excess parts must be continually returned to the vibratory apparatus and they exhibited other shortcomings. One such shortcoming was repeated recycling could cause excessive wear with some parts and another shortcoming was the diverter would not necessarily provide the precise flow cut off desired.

A second technique for dealing with the over feed problem was to slow down the oscillations as the requisite number of parts was neared during the feed process. This slowing down of the vibration as the correct part number was neared resulted in a reduced through put for the system. Instead of operating at maximum efficiency for the full cycle for a given batch, the oscillations were slowed as the proper count was neared. This technique also required control circuitry to monitor the number of parts in the accumulator and compare that number with the final count to be achieved.

SUMMARY OF THE INVENTION

The present invention obviates the need for a diverter or other type of over feed compensation and includes an improved amplitude of oscillation sensing technique. The result of these innovations is a maximum through put of parts. A stopping or braking mechanism of increased efficiency is provided which applies a damping force to the feeder's vibratory bowl. The damping force causes the bowl to stop vibrating more rapidly than prior art systems. The bowl can be driven close to maximum speed until the proper article count or weight has been accumulated. An increase in efficiency of the order of 40 to 50% can be achieved when article batches of small quantity are fed by the system. An amplitude control signal is generated which results in an adequate control signal at all amplitudes of oscillation and in particular for low level oscillation used in small batch feeding.

A typical dispensing apparatus embodying the present invention includes a drive means for vibrating a bowl mechanism which in turn imparts motions to a unit or part to be counted. Apparatus of the present invention further includes a control circuit which carefully monitors the amplitude of oscillation and applies a braking force when the vibrating power is turned off.

More particularly, the control circuit includes a speed control circuit for controlling the amplitude of bowl oscillations. An amplitude sensing circuit which comprises a Hall effect transducer is included for monitoring the bowl oscillations. A power circuit receives a control signal generated by the combined operation of the amplitude sensing and the speed control circuit and produces a driving signal to a bowl coil. Energization and de-energization of this bowl coil produces movement of the vibratory bowl due to electromagnetic interaction between a stationary and moving portion of an electro-magnetic system.

The control circuit also includes a braking control for reversing the current flow through the bowl coil thereby reversing the direction of oscillation inducing force applied to the bowl. This current reversal in conjunction with a mechanical brake rapidly terminates bowl vibrations and thereby minimizes the over feed problem.

In a preferred embodiment, the braking control sends a timed braking signal to the power circuitry after a desired number of parts have been dispensed from the bowl. This signal causes the bowl to be driven but in a timing sequence which disrupts the original oscillations. The braking circuit causes a reversal in bowl coil current for a time period long enough to damp vibrations but not so long that the reverse bowl current again drives the bowl into vibration.

The power circuit of the preferred embodiment includes controlled rectifiers for sending power signals to the bowl coil. A gating signal allows current to flow in these controlled rectifiers in response to control signals from the speed control and braking control circuitry. When the bowl is driven during normal feed operation, a first controlled rectifier is periodically rendered conductive in response to signals from the speed control circuit. When controlled braking is to be applied, a second controlled rectifier in the power circuit is rendered conductive.

A comparator which has one input connected to the amplitude sensing circuit and a second input connected to a reference voltage insures that the braking signals are applied for an appropriate time period. When the action of the reversed bowl current reduces the amplitude of oscillation, the input from the amplitude sensing circuit becomes less than the reference input and the second controlled rectifier in the power circuit is rendered non-conductive.

At the same time the second controlled rectifier is rendered conductive, the mechanical brake is activated to enhance bowl braking. In the preferred embodiment of the invention the mechanical brake includes a coil which when energized causes a bowl support to be attracted toward and come in contact with a bowl base structure. The mechanical brake is slower acting than the braking action achieved by current reversal through the drive coil so by the time physical contact is made bowl vibration has already been significantly damped. This difference in speed between the two braking actions diminishes wear on the mechanical brake. Were it not for the mechanical brake, it is possible that reversed bowl current through the second controlled rectifier would not only disrupt the bowl rhythm but begin to affirmatively drive the bowl through reverse bowl coil energization.

From the above it is apparent that one important feature and object of the present invention is to provide a damping or braking force to a driven vibratory feeder mechanism. In this way a more efficient counting mechanism is provided without the use of diverter or other excess unit compensation techniques. The system vibrates at a constant frequency of oscillation throughout its batch processing and is rapidly stopped by a combined mechanical and electrical brake after a batch of parts has been dispensed.

A further objective is an amplitude sensing circuit which accurately transmits amplitude data to the power circuit. This improved amplitude sensing is more accurately representative of the amplitude than prior art amplitude sensing techniques. These and other features and objects of the invention will be better understood when considered in conjunction with the detailed description of the invention and the accompanying drawings.

BRIEF DESCRIPTION OF THE DRAWINGS

FIG. 2 is a top plan view of a vibratory feeder bowl.

FIG. 3 is a side plan view of the bowl illustrated in FIG. 2.

FIG. 9 shows voltages across a bowl drive coil as the bowl is both driven and stopped.

DETAILED DESCRIPTION OF THE INVENTION

Figure 1:
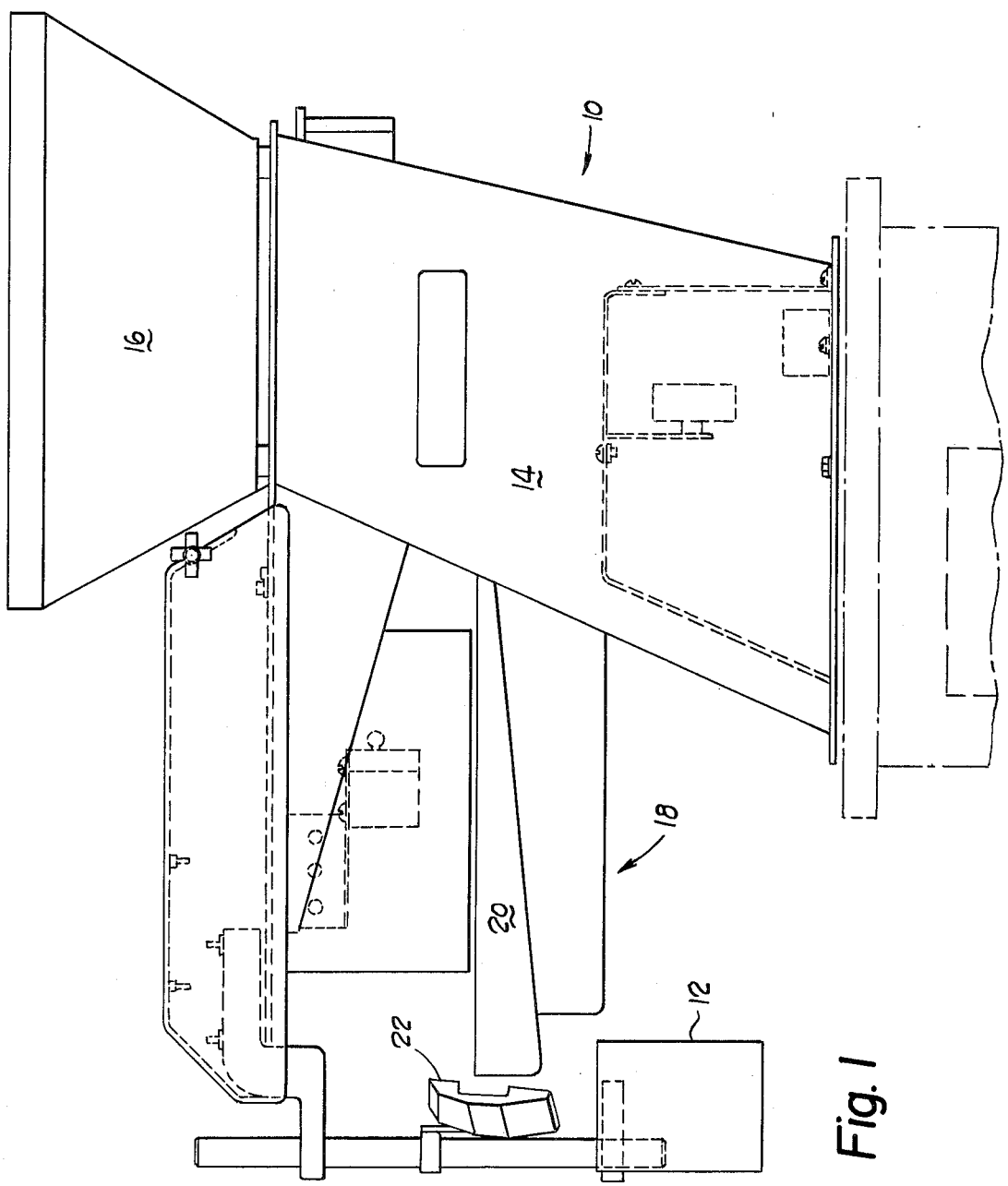
FIG. 1 is a side view of material handling apparatus embodying the present invention.

Referring to FIG. 1, a material dispensing apparatus using the preferred embodiment of the present invention is indicated generally by the numeral 10. The apparatus 10 is operative to dispense articles, such as pills, washers, screws, or other small items into a container 12 positioned next to the article handling apparatus 10.

The apparatus 10 includes a base structure 14 which supports a supply hopper 16, and a vibratory feeder 18. The vibratory feeder 18 includes a feeder hopper or bowl 20 which deposits the units into the container 12. In operation, articles to be dispensed are loaded into the supply hopper 16. The material dispensing apparatus then feeds controlled amounts of articles from the supply hopper 16 into the feeder 18. Vibratory motion of the feeder causes the articles to move from the feeder 18 into the accumulator bucket or container 12. A limit switch assembly (not shown) maintains a predetermined amount of articles in the feeder 18 by controlling article movement from the supply 16 to the feeder 18.

The operation of the vibratory feeder can be controlled by an external signal from a counting unit 22.

This signal will automatically control the dispensing of a predetermined amount or weight of articles into the accumulator or container 12. After the required number of articles have been accumulated, the article dispensing apparatus 18 is turned off and motion ended by means of the braking system embodied by the present invention.

Further details of a preferred vibratory accumulator unit as embodied by the present invention can be found in U.S. Pat. No. 4,095,723 which has been assigned to Automated Packaging Systems, Inc., the assignee of the present invention. This patent is specifically incorporated by reference particularly the section of the specification entitled "the weighing unit" beginning at column 11.

Referring now specifically to FIGS. 2–5, it is shown how the present apparatus produces a vibratory movement to propel articles to be accumulated along a spiral path in the bowl 20. More specifically, FIGS. 2 and 3 depict a vibratory feeder bowl 20 used for accumulating the parts to be counted once they are dumped from the feeder hopper 16. The parts are deposited in the bowl 20 and are caused to vibrate in a spiral path 24 until they reach the end of that path and are dumped from the vibratory bowl into the container 12. As seen in FIGS. 2 and 3 the vibratory bowl includes four flange elements 26 spaced at well defined locations about the periphery of the feeder bowl. Each of these flanges includes a threaded aperture 28 for receiving a connector which mounts the vibrating bowl to an oscillating arm 44 (see FIGS. 4 and 5). In this way, the vibratory bowl is suspended from the arms and, as will be seen with reference to FIGS. 4 and 5, can be caused to oscillate to create movement in the parts along the bowl's path 24.

Figure 4:
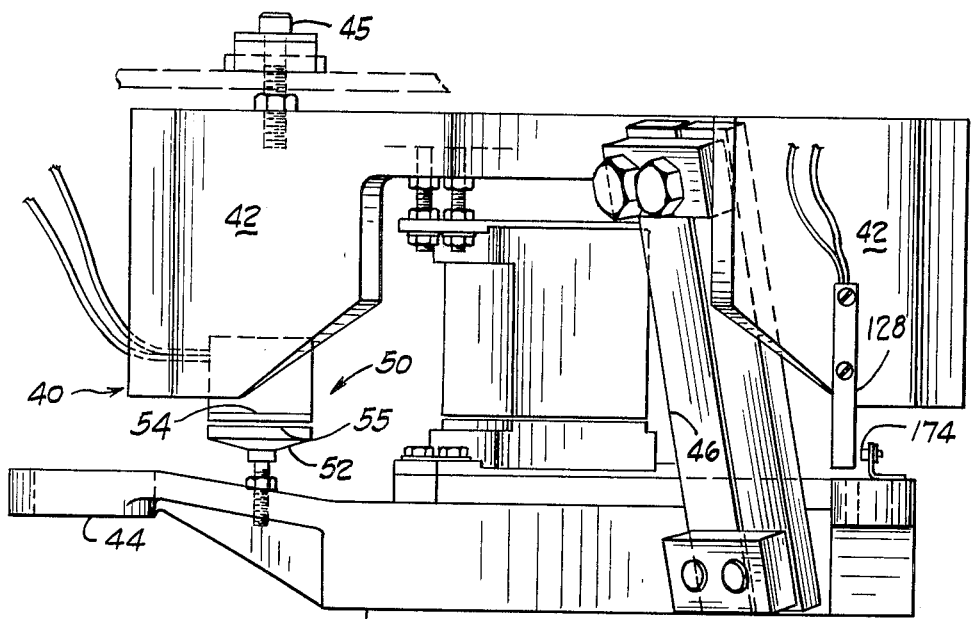
FIG. 4 is a side view depicting a mounting mechanism for the feeder bowl.
Figure 5:
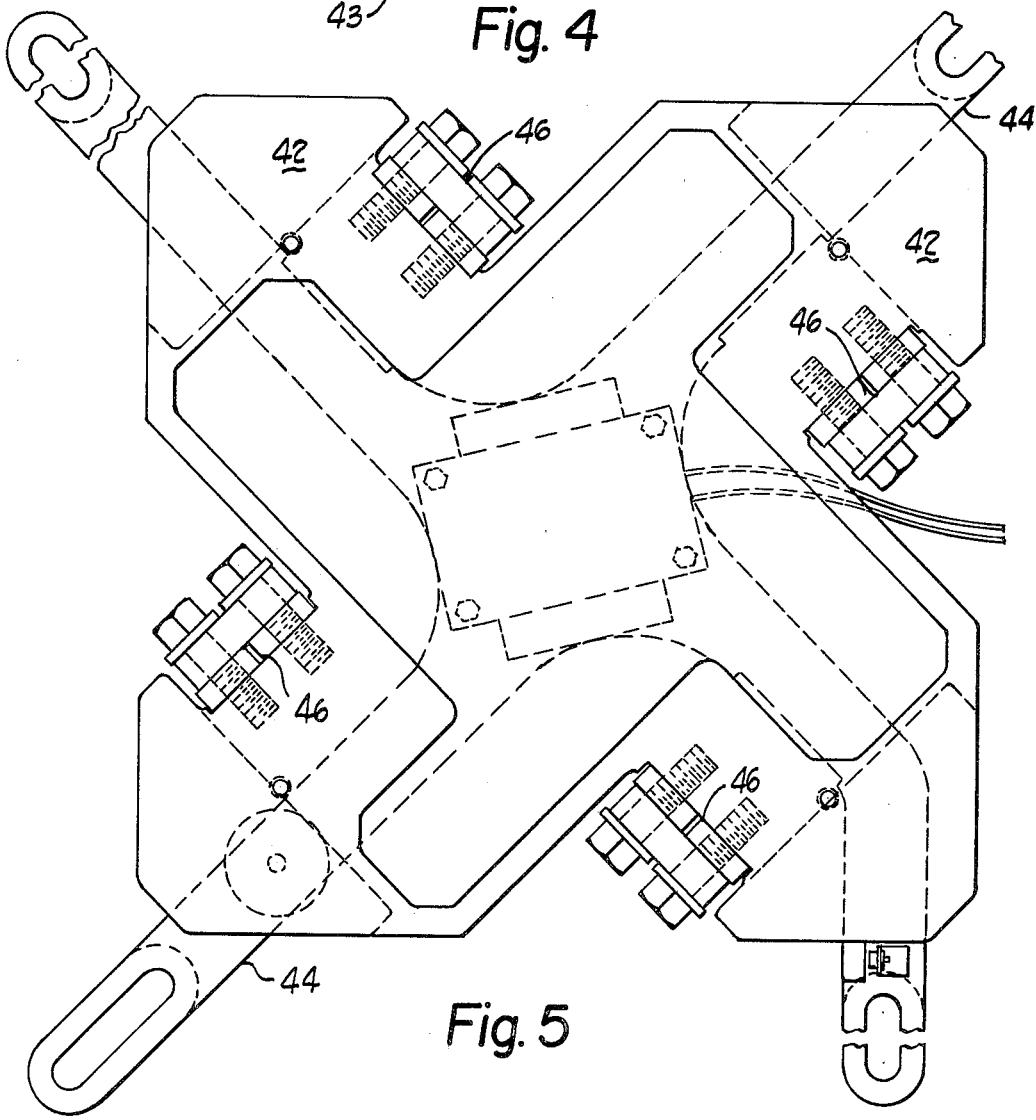
FIG. 5 is a top plan view of the mechanism of FIG. 4.

Referring now to FIGS. 4 and 5, apparatus for oscillating the bowl is referred to generally by reference numeral 40. This apparatus 40 includes a massive supporting frame element 42 and a much lighter suspended element 43 including the arms 44 which extend generally radially. The radially extending arms 44 include apertures which align with the apertures 28 in the flanges 26. Bolts, not shown, threaded into the apertures 28 join the vibratory bowl with the radially extending arms. The element 42 is suspended from the frame of the dispenser 10 by bolts 45 which thread into apertures in the frame element 42.

The suspended element 43 is suspended from the support element 42 by means of flexible leaf springs 46. As seen in FIG. 4, the leaf springs are attached to the support element 42 and suspended element 43 by means of suitable connectors which in a preferred embodiment comprise a threaded bolt arrangement. The leaf springs 46 are angled with respect to the vertical in such a way that relative vertical motion between the radially extending arms 44 and the support element 42 will produce a circular oscillatory movement of the radially extending arms and the attached bowl.

Relative vertical motion between the support element 42 and the arms 44 is achieved by means of an electromagnetic motor which utilizes conventional I and E laminations. The E laminations are mounted to the supporting element and the I laminations to the radially extending arms. Energization of the E laminations causes a relative motion due to the changing flux which energization produces. This flux interacts with the I laminations causing electromagnetic forces to be created between the two halves of the motor. These forces cause the radially extending arms to move vertically relative to the supporting element 42. This motion is caused by the attraction of the I laminations to the field produced in the E laminations.

Due to the angled mounting of the leaf springs 46, the vertical movement caused by the electromagnetic interaction becomes a combined, relatively slow, circular and vertical movement. When the magnet is deenergized, energy stored in the springs rather suddenly drives the bowl down and in the opposite circular direction. Inertia of parts along the spiral bowl ramp causes them to "climb" the ramp when the bowl is spring driven. This climbing causes the parts located within the bowl to move along the spiral bowl ramp and drop into the accumulating container shown in FIG. 1.

A mechanical brake 50 is connected to the support element 42. Mounted to one of the radially extending arms 44 beneath the brake 50 is a wear element 52. Inside the brake 50 is mounted a brake coil 53 (FIG. 7) which when energized attracts the wear element causing a brake surface 54 to contact a wear surface 55. This braking in combination with a current reversal in a bowl coil 110 which wraps around the E laminations of the electro-magnet brings the bowl 20 to a stop after a desired number of parts have been fed into the container 12.

During the feed operation, oscillatory forces are applied to the bowl by alternate energization of the electromagnet. During the energization, current passes through the bowl coil 110. The resultant electromagnetic force between the I and E laminations reduces the distance between the base and radial arms. When current is removed from the bowl coil, the restoring action of gravity and the leaf springs increases the gap between the base and arms. The cyclical energization and de-energization of the coil results in up and down oscillatory movement which imparts spiralling oscillations to the bowl.

Figure 6:
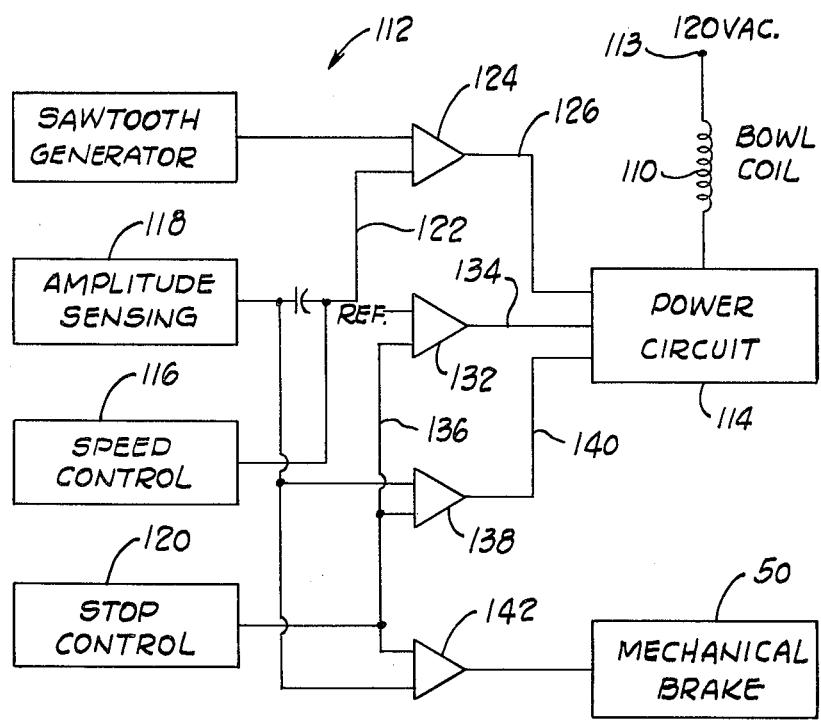
FIG. 6 is a schematic of a control circuit for controlling the vibration of the feeder bowl.

The bowl oscillations and braking are controlled by a circuit 112 schematically illustrated in FIG. 6. One aspect of this circuit is the modulation of the amplitude of oscillation in response to the weight of parts carried by the vibratory bowl. When the bowl is relatively full, more power must be supplied to the electromagnetic motor to achieve the same amplitude of vibration. A second aspect of the disclosed circuit is to provide braking action to the bowl when an appropriate number of parts have been dispensed. Were it not for this braking, the vibratory bowl would continue to oscillate with a natural undamped frequency which would cause excess parts to be dispensed. This cause of inaccuracy has substantially been eliminated by means of the unique and novel braking technique.

The control circuit 112 comprises a power circuit 114 which allows current to flow through the bowl coil 110. The coil 110 is driven by a source of energy 113 which in one embodiment comprises a 120 volt alternating current source of 60 cycles per second. Since the bowl coil 110 wraps around the magnet's E laminations, energization and de-energization of the coil 110 causes the bowl 20 to vibrate due to the mechanical structure of the bowl support. As described hereinafter the power circuit 114 controls the timing and direction of current flow through this bowl coil.

The control circuit 112 further includes a speed control circuit 116, an amplitude sensing circuit 118, and a counter or switch 120 which in combination control energization of the bowl and brake coils 110, 53. The amplitude sensing circuit 118 and speed control circuit 116 are connected and combine to generate an output 122 proportional to both a desired amplitude of vibration and the actual amplitude of vibration of the bowl feeder. This output 122 is compared to a sawtooth voltage signal by a comparator 124 which produces an input 126 to the power circuit 114. The status of this input 126 determines the amount of power transmitted through the bowl coil 110 by the power circuit 114. The amplitude sensing circuit 118 includes a Hall magnetic transducer 128 (See FIG. 7) which provides an oscillating signal proportional to the amplitude of oscillation imparted to the bowl mechanism. In this way, a feed back signal dependent on the amplitude of feeder oscillation is combined with a speed control signal dependent on desired amplitude of oscillation.

The comparator 124 selectively renders conductive a switching means such as a silicon control rectifier 130 (See FIG. 7) within the power circuit 114. When the silicon control rectifier is rendered conductive, it allows the alternating current source 113 to drive the bowl coil 110 for a controlled time period. The control from the speed control circuit 116 is modified in response to the amplitude of vibration as sensed by the Hall effect transducer 128. As a result, a combined speed and amplitude control technique is achieved for controlling the amount of power sent to the bowl coil 110.

A second comparator 132 deactivates signals from the first comparator 124 by controlling a second input 134 to the power circuit 114. When a stop control input 136 to the second comparator 132 drops in response to a parts counter or switch, the driven oscillation of the bowl is terminated.

To damp continuing oscillations, a third comparator 138 produces a signal on a third input 140 to the power circuit 114 causing alternating current to pass through the bowl coil 110 but in a direction opposite to the direction of current flow during normal bowl oscillation. This reversing of bowl coil current flow causes the bowl to be damped much more quickly than it would if the power were merely removed from the coil. The reverse current signal is maintained for enough oscillations to damp the bowl mechanism. A fourth comparator 242 energizes the brake coil 53 of the mechanical brake 50. The mechanical brake 50 is slower acting than the disruption achieved by current reversal in the bowl coil 110 but clamps the relatively moving bowl 20 and support 42 to avoid any possibility that the bowl 20 may be overdriven by the reverse bowl coil current.

Figure 7:
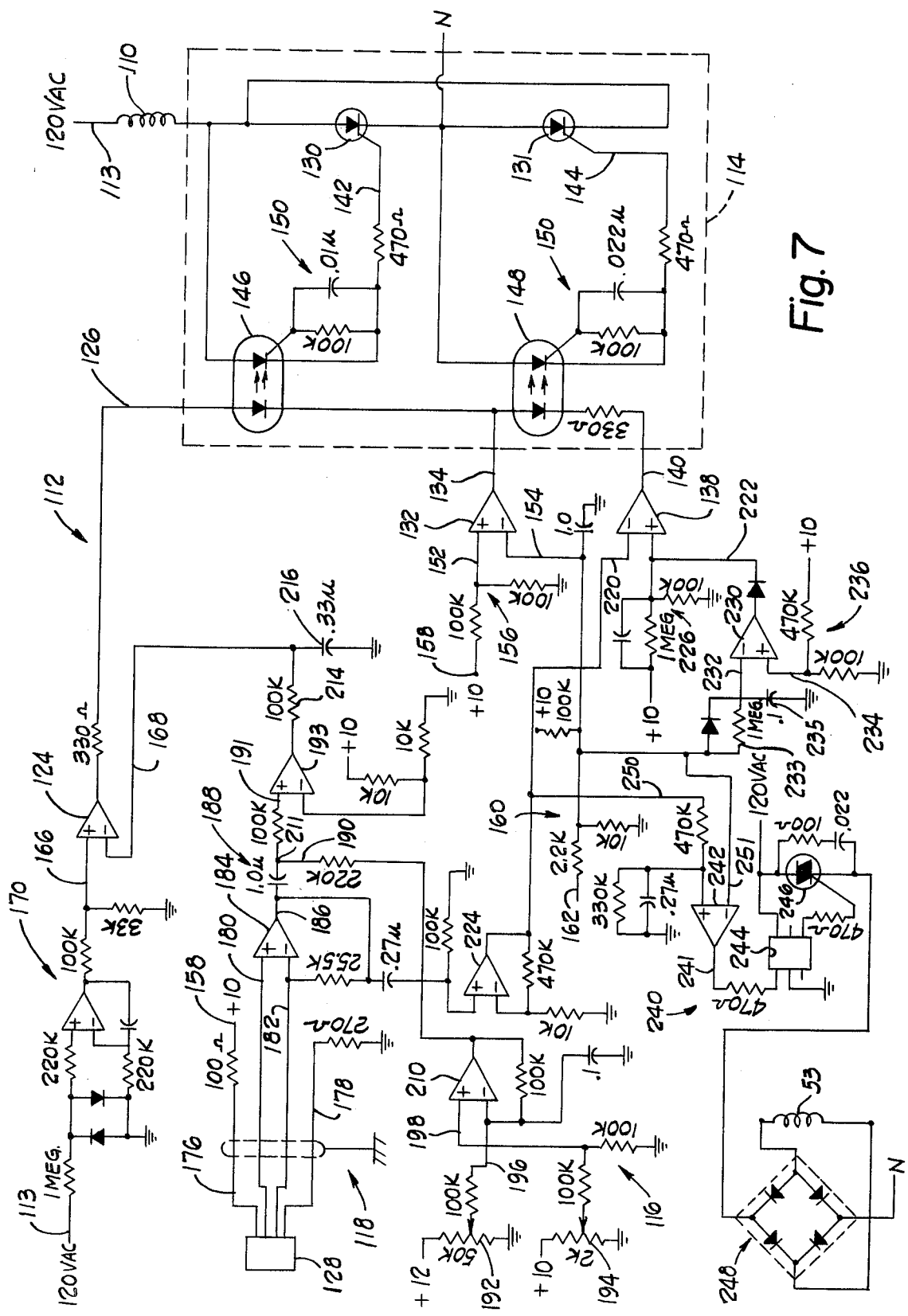
FIG. 7 is a more detailed schematic of the control circuit shown in FIG. 6.

A detailed schematic of the control circuit 112 is illustrated in FIG. 7. Unless otherwise noted, all resistors are ¼ watt resistors and all capacitors are indicated in micro farads. Many of the elements within the circuitry are chosen for convenience but it should be appreciated to those skilled in the art that certain design modifications could be made in the resistor or capacitor values without departing from the spirit of the invention.

As seen in FIG. 7, current flow through the bowl coil 110 is controlled by two silicon control rectifiers 130, 131. Depending on the conduction states of these two rectifiers, current can flow through the bowl from the 120 volt source in one of two directions. During normal vibratory operation (i.e., when parts are to be moved along the spiral ramp) a drive SCR 130 will allow conduction through the bowl in one direction. The other SCR 131, which will be referred to as a braking SCR, is rendered nonconductive so the bowl coil will be energized during only a maximum of one half the alternating current cycle. During the half cycle the drive SCR may not conduct, the bowl will be driven in an opposed direction by the combined action of the leaf springs and gravity as noted previously.

When the requisite number of parts have been accumulated or the proper weight of parts dispensed, the drive SCR 130 is rendered nonconductive and the brake SCR 131 is rendered conductive for a brief period of time to dynamically brake the bowl by allowing a back current to flow through the bowl coil in a direction opposite to its part feed flow. This back current disrupts the rhythm of oscillations produced by action of the drive SCR 130 and quickly brakes the bowl. No excess units or parts are dispensed by continued vibration of the bowl and unlike some prior art systems during the bowl drive portion uniform frequency and amplitude of bowl oscillation is maintained.

Gating inputs 142, 144 to the two SCR's 130, 131 are connected to a pair of optically coupled SCR's 146, 148. When these optically coupled SCR's conduct, gating signals are sent to the SCR's 130, 131. The gate connection is achieved through filter circuits 150 which suppress transient signals from reaching the SCR gates 142, 144.

The optically coupled SCR's 146, 148 provide a signal to a connected one of the gates 142, 144 in response to the voltage on three inputs 126, 134, 140 to the power circuit 114. One optically coupled SCR 146 will conduct whenever a first input 126 is greater than the second input 134. The second optically coupled SCR 148 will conduct and therefore turn on the brake SCR 131 whenever the second input 134 is greater than the third input 140. It is control of the three inputs which determine how the vibratory bowl is driven and damped.

The second comparator amplifier 132 transmits its input 134 midway between the two optically coupled SCR's 146, 148. During normal powered operation of the vibratory bowl, this input 134 is maintained at a low or ground potential. This state is achieved through control of the amplifier's two inputs 152, 154. A first input 152 is maintained at a reference voltage of about 5 volts by a voltage divider 156 and a 10 volt power source 158. A second input 154 is maintained in an approximately 10 volt level due to connection to a second voltage divider 160 and a 12 volt control input 162 from the parts counter 22. During normal feed operation of the system, the 12 volt control input and voltage divider 160 maintains the input 154 to the second amplifier 132 at a value of approximately 10 volts. When this input is compared to the 5 volt input on the other input 152, a low or ground output 134 is sent to the connection between the two optically coupled SCR's 146, 148.

The control input 162 from the counter 120 drops to about one volt when a desired number of parts have been fed from the bowl 20 into the container. When the control input 162 drops below 5 volts, the force vibration of the bowl is stopped due to the change in output by the second amplifier 132. When the input 154 is compared to the positive 5 volt voltage on the other input 152, the output 134 changes from its low ground state to its high state. In this configuration, no current may pass through the optically coupled SCR 146 which as a result sends no gating signals to the bowl drive SCR 130. Thus, when the control input 162 is low the bowl drive SCR 130 is maintained in a nonconducting state and the bowl drive vibrations are removed. Although in the preferred and disclosed embodiment a counter 22 generates the control input 162 it should be appreciated that a simple on/off switch could also be used to lower the input 154 thereby rendering the drive SCR 130 non-conducting.

When the control input 162 is high, i.e. parts are being fed, the optically coupled SCR 146 may or may not conduct depending on the state of a second input 126 to the power circuit. With the input 134 low, the optically coupled SCR 146 conducts so long as the input 126 from the first or drive bowl comparator 124 is in a high or positive state. In this configuration, power will flow through the optically coupled SCR 146 sending a gating signal to the drive bowl SCR 130.

The comparator 124 which generates the signal 126 to the optically coupled SCR 146 has two inputs 166, 168 the relative size of which dictate whether the optically coupled SCR 146 conducts. A first input 166 transmits a reference signal which is a sawtoothed waveform. A 120 volt alternating current 113 is shaped into a sawtooth waveform by a sawtooth generator 170 to form this waveform.

The second input 168 to the comparator 124 transmits a signal generated by the combined action of the amplitude sensing circuit 118 and the speed control circuit 116. When the input 166 from the sawtooth generator is greater than the input 168, the output 126 from the comparator 124 will be high and current may pass through the optically coupled SCR 146. Conversely, when the input from the sawtooth generator is lower than the input 168 the output 126 will be low and the optically coupled SCR will not conduct. Thus, when the sawtooth waveform reaches a voltage above the waveform from the combined action of the amplitude sensing and speed control circuitry the optically coupled SCR sends a gating signal to the bowl drive 130 rendering that bowl drive SCR conductive. When this occurs a 120 volt alternating current source 113 energizes the bowl coil 110 causing bowl vibration.

The amplitude sensing circuit 118 comprises the Hall effect transducer 128 mounted to the support 42 in spaced relation to a magnet 174 (FIG. 4) mounted to one of the radially extending support arms 44. The Hall effect transducer 128 is energized by an input 176 coupled to the 10 volt source 158. A second input 178 is grounded. The 10 volt source 158 causes current to flow through the Hall effect transducer 128 which is modulated by the magnetic field in the vicinity of the magnet 174. As relative motion occurs between the magnet 174 and the transducer 128 an oscillating voltage output appears at two outputs 180, 182 from the Hall effect device 128.

These outputs 180, 182 are coupled to a differential amplifier 184 having an output 186 proportional to the voltage difference between the two outputs 180, 182. As the amplitude of bowl vibration increases the average voltage difference between these two outputs 180, 182 increases and therefore the differential amplifier output 186 is a measure of bowl amplitude of vibration.

After passing through a coupling capacitor 188 the differential amplifier output 186 is combined with an output 190 from the speed control circuit 116. This output 190 adds to the output 186 from the differential amplifier 184 and produces an input signal 191 to a comparator amplifier 193. The input 191 is thus related to both sensed amplitude of vibration and desired amplitude of vibration.

The speed control circuit 116 comprises two tapped variable resistors 192, 194 coupled to a twelve and ten volt sources respectively. The variable resistors 192, 194 are adjustable by the user to selectively tap the two voltage sources and generate two voltage inputs 196, 198 to a differential amplifier 210. The amplifier 210 substracts the signal at its non-inverting input 196 from its inverting input 198. By adjusting these two inputs it is possible to generate an output 190 proportional to a desired amplitude of vibration for the feeder bowl. Once the output 190 from the speed control circuit 116 and the output 186 from the differential amplifier 184 are combined at a junction 211 the combined signal is transmitted to the comparator 193. This comparator 193 generates a pulsating waveform which is smoothed by a resistor 214 and capacitor 216 acting as an integrator. The signal 168 therefore has a level related to both desired and actual amplitude of bowl vibration.

From the above it should be apparent that the input 168 to the comparator 124 is a signal whose size depends not only on a desired speed or amplitude of the oscillation but also on the actual amplitude of oscillation as measured by the Hall transducer 128. Modifications of the signal 168 therefore occur in response to changes in the load in the feeder bowl as well as to changes introduced by the user through modification of the two speed control inputs 196, 198. In this way an amplitude sensing control is employed which accurately produces a control signal 168 dependent upon the amplitude of vibration even for small amplitudes which posed a problem for prior art amplitude sensing circuitry.

The comparator 124 compares its two input signals, 166, 168 and produces an output 126. As noted previously, the comparator is configured such that when the input 166 from the sawtooth generator 170 is greater than the input 168, the output 126 from the comparator will be high and current may pass through the optically coupled SCR 146. Conversely, whenever the input 166 is lower than the input 168, the output 126 will be low and the optically coupled SCR 146 will not conduct. Thus when the sawtoothed waveform reaches a voltage above the waveform from the combined action of the amplitude sensing and speed control 124, the comparator 124 produces a high level output and the optically coupled SCR 146 sends a gating signal to the bowl drive SCR 130. This gating signal renders the bowl drive SCR 130 conductive so the 120 volt alternating current source 113 energizes the bowl coil 110 and vibrates the bowl.

When the sawtoothed waveform drops below the signal 168, the comparator 124 produces a low output and the optically coupled SCR is turned off. The gating signal to the bowl drive SCR 130 stops and the 120 volt alternating current source 113 no longer energizes the bowl coil 110. The effect of the comparison made by the comparator 124 is to render conductive the optically coupled SCR 138 during selective portions of the sawtooth waveform. Thus, if the sawtooth 168 is greater than the signal 168 for only a small portion of the alternating current cycle, the bowl coil 110 will be energized for a short time and little power applied to the bowl. If the sawtooth signal 166 exceeds the amplitude and speed control signal 168 for a greater portion of the cycle, more power drives the feeder bowl.

As the load within the bowl changes, the portion of the AC cycle during which the bowl coil is energized varies to maintain constant amplitude vibrations. When a large number of parts are dumped from the supply hopper 16 to the vibratory bowl 20, the bowl must be driven with more power to achieve constant amplitude oscillation. This is achieved since the output 186 from the amplitude sensing circuit is lowered and the sawtooth waveform is greater than the signal 168 for a longer time period which renders the optically coupled SCR 146 conductive for a longer time period. As this greater power achieves a larger amplitude, the amplitude circuit output 186 again increases and the time of conduction again descreases until a uniform amplitude of oscillation is achieved.

Figure 8A:
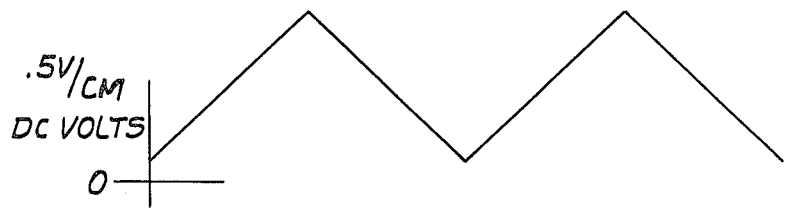
FIGS. 8A–8C show voltage waveforms at certain locations of the control circuit of FIG. 7.
Figure 8B:
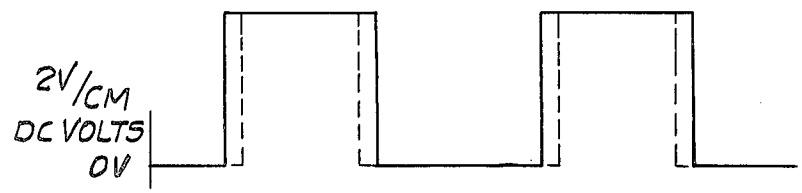
Figure 8C:
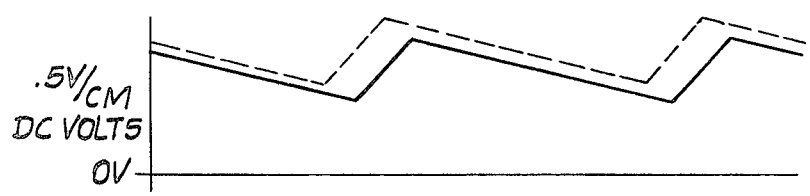

FIGS. 8A–8C show waveform diagrams for the two comparator inputs 166, 168 and the output 126 for two different amplitudes of bowl vibration. The vertical coordinate indicates signal size and the horizontal coordinate is time. The solid line represents waveforms for a 0.10 inch amplitude of bowl vibration and the dotted line represents a 0.05 inch amplitude.

As noted the input 166 (8A) is a sawtooth waveform and the input 168 (8C) is dependent on the amplitude of vibration. The output 126 (8B) is seen to be "high" for a longer time period for the larger amplitude of vibration, indicating the bowl coil 110 is driven for a greater portion of the alternating current cycle when a larger amplitude vibration is desired.

When the control voltage 162 goes low, the first optically coupled SCR 146 stops gating the drive SCR 130 and the power circuit 114 affirmatively damps the bowl vibrations. To achieve this damping, a braking SCR 131 allows current to flow through the bowl coil 110 in a direction opposed to the positive bowl drive. When the brake SCR 131 is rendered conductive, therefore, a signal passes through the bowl coil 110 which sets up electromagnetic interactions between the I and E laminations and damps motion of the feeder bowl 20.

The state of the output 140 from the third comparator 138 determines how long this reverse current passes through the bowl coil 110. Once the control voltage 162 goes low, the output 134 from the comparator 132 remains high until bowl vibrations are again initiated. Thus, the SCR 131 will be gated by the optically coupled SCR 148 so long as the output 140 from the comparator 138 is low.

The state of the output 140 is determined by two inputs 220, 222. A first input 220 is coupled to the output 186 from the amplitude sensing circuit 118 through a gain of 47 amplifier 224. The signal appearing at this input 220 is an oscillating signal 47 times larger than the oscillating signal 186 from the differential amplifier 184. A second input 222 is coupled to a voltage divider 226 and the output from a comparator amplifier 230. When bowl vibrations are to be stopped, the output from the comparator 230 is initially low so that the input 222 is maintained at a value of approximately 1 volt by action of the voltage divider 226 coupled to a 10 volt source 158. The input 220 is an oscillating signal which causes the comparator 138 to generate a low output when greater than the input 222 and a high output when it is less than the input 222. As the Hall device 128 oscillates in relation to the magnet 174, the output 140 oscillates on and off causing the SCR 148 to send gating signals to the SCR 131. The SCR 131 reverse drives the bowl coil 110 whenever it is gated into an on condition and the amplitude of vibration rapidly decreases. As the amplitude of vibrations decreases, the Hall device generates smaller signals until the input 220 becomes less than the 1 volt input maintained on the input 222. When this occurs the comparator 138 generates a constant high level output 140 thereby turning off the SCR 131.

As the amplitude of vibration decreases due to the dynamic braking action of the SCR 131, the gating signals on the gating input 144 remain high for less time per bowl vibration. Thus, initially the SCR 131 conducts for essentially a complete half cycle of the source 113. As amplitude of vibration decreases the SCR 131 is gated into conduction later in the cycle. As noted previously when the input 220 from the Hall transducer 128 falls below 1 volt all gating signals cease.

FIG. 9 shows the change in voltage across the bowl coil 110 as damping occurs. Initially the coil 110 is shown driven by the source 113. The power applied to the bowl is moderate since the on time of the drive SCR 130 is substantially less than an entire half cycle. At a point 223 the counter input 162 goes low and dynamic braking begins. The brake SCR 131 is rendered conductive and the source 113 disrupts motion by reversing the current through the coil 110 by driving it out of phase with the rhythm set by the drive SCR 130. Initially this reverse current is applied for essentially an entire half cycle. As the amplitude diminishes, however, the input 220 is greater than the input 222 for less time and therefore the braking power decreases.

The comparator 230 provides a mechanism whereby dynamic braking action by the SCR 131 is mantained for only a limited amount of time. A first input 232 to the comparator 230 is coupled to the stop control input 162 from the counter. When an appropriate number of parts have been dispensed from the bowl 20 this line goes low causing the input 232 to also go low. Due to the action of a resistor 233 and capacitor 235, however, a time delay of approximately 200 milliseconds is experienced before the input 232 goes low in response to the control input 162. A second input 234 to the comparator 230 is coupled to a voltage divider 236 which maintains the input 234 at a value of slightly less than 2 volts. After a time delay of approximately 200 milliseconds, therefore, the comparator 230 changes states generating a high output to the input 222 on the comparator 138. This high output 222 when compared to the oscillating signal from the Hall transducer 128 will insure that the output 140 is high and that the brake SCR 131 is disabled. This safety mechanism prevents the brake SCR 131 from continuing to conduct. If allowed to do so current flow through the SCR 131 might not only disrupt oscillations and damp motion but begin to drive the bowl 20 causing parts to be dispensed.

After the dynamic braking caused by gating the brake SCR 131 has reduced bowl motion the mechanical brake 50 momentarily clamps the bowl 20 to the support 42. When a brake coil 53 is energized, the mechanical brake surface 54 contacts the wear surface 55 and all bowl vibration is terminated. A brake coil energization circuit 240 comprises a comparator 242, a switch 244, a triac 246 and a rectifier 248. When an output 241 from the comparator 242 goes high, the switch 244 transmits a gating signal to the triac 246 causing 120 volt alternating current to be transmitted through the triac to the rectifier 248. The rectifier 248 is a full wave rectifier causing pulsating DC signals to be applied to the brake coil 53.

The output 241 from the comparator 242 varies in response to the relative size of signals appearing at two inputs 250, 251 for that comparator 242. A first input 250 is coupled to the gain of 47 amplifier 224 and therefore transmits an oscillating signal proportional to the amplitude of bowl vibration to the comparator 142. A second input 251 is coupled to the control input 162 from the counter and is maintained at a value of approximately 10 volts during forced bowl vibration and drops to a value of about 1 volt when braking action is initiated. During normal bowl vibration therefore the input 251 is maintained at a value greater than the input 250 and the coil remains deenergized. When the signal 162 from the counter goes low, the input 251 becomes less than the input 250 and the brake coil 53 is energized. This energization causes the wear surface to be attracted towards the brake 50 and mechanically clamps bowl oscillation.

Since the mechanical brake is slower acting than the dynamic braking, however, by the time the mechanical brake contacts the wear surface substantially all bowl vibration should have been terminated. As bowl vibration diminishes, the input 250 from the gain of 47 amplifier 224 also diminishes and after a certain time period the output 241 from the comparator 242 again goes low deenergizing the brake coil 53. Thus, during normal operation, the brake 50 only contacts the surface 55 for a short period of time until the coil 53 is deenergized. By completely damping bowl coil motion the brake 50 provides another safe guard against the SCR 131 driving the bowl 20 back into oscillation. That is, when the brake clamps the bowl 20 the amplified Hall signal at the input 220 must be zero so the comparator 138 generates a high output to deactivate the brake SCR 131.

While a preferred embodiment of the invention has been disclosed in detail, various modifications or alterations may be made herein without departing from the spirit and scope of the invention set forth in the appended claims.

What is claimed is:

1. In a material dispensing apparatus including a drive means for vibrating a driven bowl, a control circuit comprising:
   (a) a speed control circuit for providing a control signal representing an optimum vibratory oscillation amplitude;
   (b) an amplitude sensing circuit for monitoring bowl oscillations and modifying said control signal in response to the amplitude of said oscillations;
   (c) a power circuit for receiving said modified control signal and providing a driving signal to the drive means; and
   (d) a brake coupled to the control circuit for damping vibratory oscillations of the bowl.

2. The circuit of claim 1 wherein the power circuit comprises switching means for sending power to said drive means at controlled times and in controlled polarities.

3. The circuit of claim 2 wherein the switching means comprise a first and second controlled diode, said first diode controlling one direction of current through a bowl drive coil and the second diode for controlling an opposed direction of current through said bowl drive coil.

4. The control circuit of claim 3 which further comprises means for generating an output connected to the switching means for controlling the conduction of said second controlled diode.

5. In a material dispensing apparatus including a drive means for vibrating a driven bowl flexibly coupled to a support, a control circuit comprising:
   (a) a speed control circuit for providing a control signal representing an optimum steady state vibratory oscillation amplitude;
   (b) an amplitude sensing circuit for monitoring bowl oscillations and modifying said control signal in response to the amplitude of said oscillations;
   (c) a source of alternating current energy;
   (d) a power circuit for receiving said modified control signal and controlling energization of the drive means by the source; said power circuit including a first and second silicon control rectifier to allow alternating current flow to said drive means in opposite directions; and
   (e) means coupled to the power circuit for opposing and reducing vibratory oscillations of the bowl to below the steady state amplitude; said means including an output for selectively rendering the first of said two silicon control rectifiers conductive for controlled periods to brake oscillations produced by energization of the drive means as controlled by said second silicon controlled rectifier.

6. The apparatus of claim 5 wherein the drive means comprises an electromagnet with a bowl coil which when energized causes electromagnetic interactions between portions of the magnet.

7. The apparatus of claim 6 wherein the first silicon control rectifier allows current to flow through the coil during bowl braking and the second silicon control rectifier allows current to flow through the coil as material is dispensed.

8. The apparatus of claim 5 which further comprises a mechanical brake having a coil which is energized as said output renders said first silicon control rectifier conductive to rigidly couple the bowl to its support.

9. A parts feeder of the vibratory type comprising:
   (a) a frame structure;
   (b) a parts bowl connected to a bowl support and including a spirally configured inclined ramp extending from a bottom of the bowl to a discharge opening;
   (c) a spring connecting the bowl to the frame structure to support the bowl for vibratory motion;
   (d) an electromagnetic drive mechanism including coactable drive and driven elements, one of the elements being connected to the frame structure and the other being connected to the bowl;
   (e) a drive circuit connected to the drive mechanism for providing pulsating electrical energy to alternately drive the bowl against the action of the spring and permit the bowl to be driven in the opposite direction by the spring;
   (f) an amplitude sensing circuit including a bowl amplitude sensing means for determining the amplitude of bowl vibration actually existing, the amplitude sensing circuit being controllably connected to the drive circuit to vary the power supply to the drive mechanism in relation to sensed amplitude to thereby maintain a substantially constant bowl amplitude;
   (g) circuitry connected to the drive mechanism and adapted to reversely energize the drive mechanism when drive circuit energization is terminated; and
   (h) brake means connected to the frame structure and actuable by said circuitry to contact the bowl support when said drive mechanism is reversely energized.

10. A vibratory parts feeder comprising:
   (a) a feeder element for guiding movement of articles therein in response to vibration of the element;
   (b) support means coupled to said feeder element to flexibly support said feeder element;
   (c) drive means mounted to said support means to impart repetitive vibrations to said feeder element;

(d) circuitry coupled to the drive means to disrupt the repetitive vibrations when a desired number of parts have been fed by said element; and
(e) brake means separate from the disrupting circuitry for completely damping relative motion between the feeder element and the support means.

11. A vibratory feeder apparatus comprising:
(a) a feeder element for guiding movement of articles therein in response to vibration of the feeder element;
(b) a drive means coupled to the feeder element to impart a steady state amplitude of vibration to said element, and
(c) braking means operable during feeder vibration below the steady state level to damp the vibrations in response to a damping signal, said braking means comprising circuitry electrically connected to the drive means to oppose and reduce the vibration to below said steady state amplitude.

12. In a material dispensing apparatus including a drive means for vibrating a driven receptacle:
(a) a control circuit comprising:
(i) a speed control circuit for providing a control signal representing an optimum vibratory oscillation amplitude;
(ii) an amplitude sensing circuit for monitoring receptacle oscillations and modifying said control signal in response to the amplitude of said oscillations;
(b) a power circuit for receiving said modified control signal and providing a drive signal to the drive means, and
(c) a brake coupled to the control circuit for damping vibratory oscillations of the bowl.

13. A method for controlling vibrations of a vibratory feeder which includes a vibratable element, said method comprising the steps of:
(a) providing a driving force to the vibratable element to produce oscillatory movement;
(b) monitoring the amplitude of vibration of said element and providing a control signal to modulate the driving force in response to said amplitude;
(c) removing the driving force;
(d) applying a damping force for damping said vibrations after said driving force has been removed, and
(e) varying the magnitude and duration of the said damping force according to the size of the amplitude of oscillation and also according to the physical dimensions of the element.

14. A vibratory parts feeder comprising:
(a) a feeder element for guiding movement of articles therein in response to vibration of the element;
(b) support means coupled to said feeder element to flexibly support said feeder element;
(c) drive means mounted to said support means to impart repetitive vibrations to said feeder element;
(d) circuitry coupled to the drive means to disrupt the repetitive vibrations when a desired number of parts have been fed by said element, and
(e) brake means for completely damping relative motion between the feeder element and the support means, said brake means comprising a first element connected to the feeder element and a second element connected to the support and wherein one of said first and second elements is energized to attract and contact the other of said first and second elements in response to a control signal from the circuitry.

15. A vibratory feeder comprising:
(a) a feeder element for feeding contents therefrom in response to vibration of the feeder element;
(b) structure for flexibly supporting the feeder element;
(c) drive apparatus couplable to a power source for vibrating the feeder element;
(d) control means for interrupting vibratory power application to the feeder element, and
(e) a brake actuable for controllably applying a holding force to the feeder element for completely stopping feeder element motion and holding said feeder element substantially motionless.

* * * * *

UNITED STATES PATENT AND TRADEMARK OFFICE
CERTIFICATE OF CORRECTION

PATENT NO. :   4,354,618

DATED      :   October 19, 1982

INVENTOR(S) :  Ronald R. Weyandt

It is certified that error appears in the above-identified patent and that said Letters Patent is hereby corrected as shown below:

Column 8, line 55, "force" should be --forced--;

Column 15, line 35, "drive", first occurrence, should be --driving--.

Signed and Sealed this

Twenty-second Day of February 1983

[SEAL]

Attest:

GERALD J. MOSSINGHOFF

Attesting Officer

Commissioner of Patents and Trademarks